Patented Feb. 25, 1947

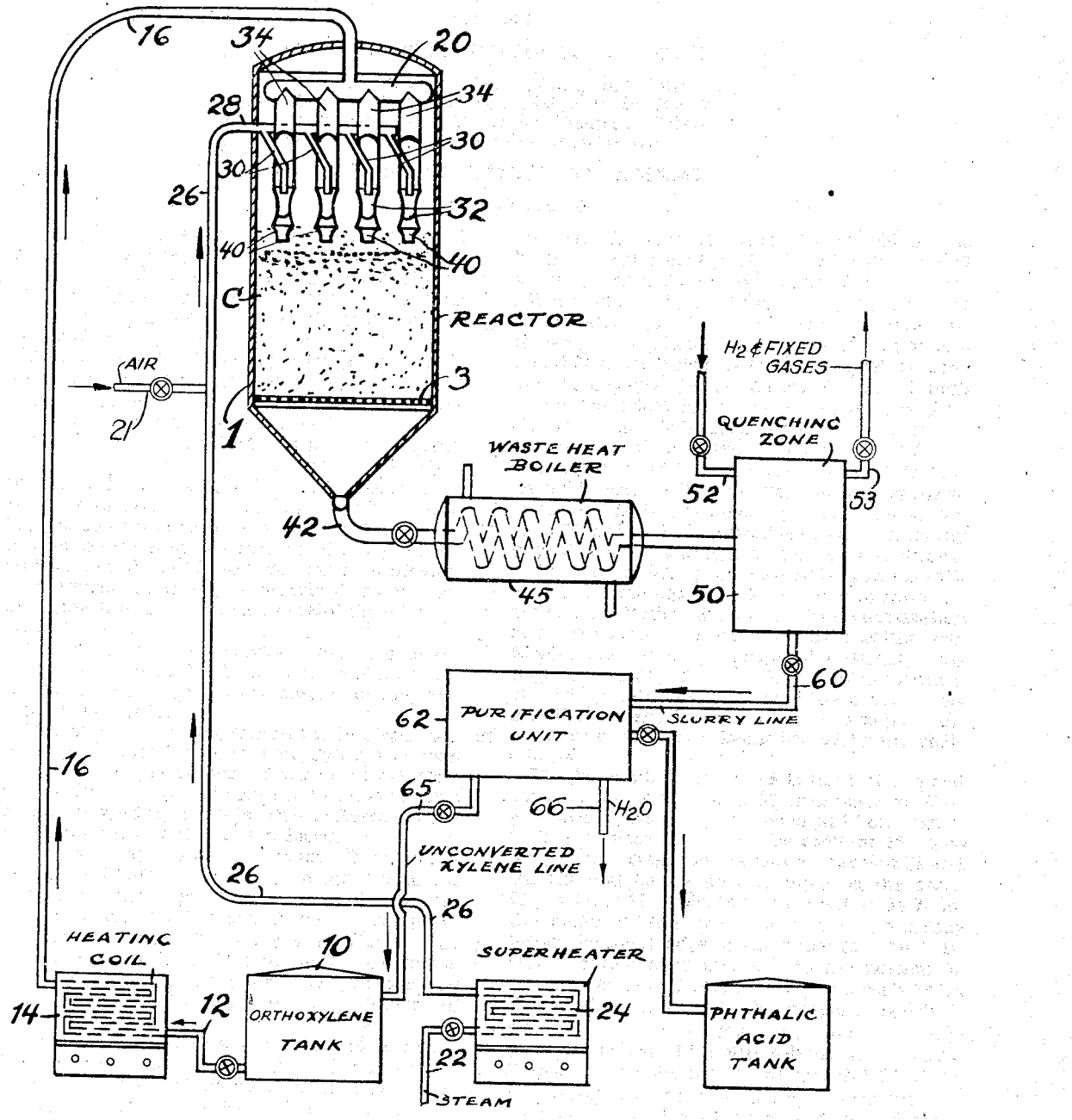

2,416,350

UNITED STATES PATENT OFFICE 2,416,350

PRODUCTION OF PHTHALIC ACID

Walter F. Rollman, Cranford, N. J., assignor to Standard Oil Development Company, a corporation of Delaware Application February 11, 1944, Serial No. 521,910

4 Claims. (Cl. 260—524)

The present invention relates to the improvements in the production of phthalic acid or anhydride, and more particularly it relates to the production from ortho-xylene of the said phthalic acid or anhydride.

One of the most critical materials at the present time is phthalic anhydride. This material is used for a number of important commercial purposes, including the manufacture of explosives, dyestuffs, resins, paints, coating compositions, etc. For the most part, phthalic anhydride has been made heretofore by the oxidation of naphthalene in vapor phase using catalyst such as $V_2O_5$ on a suitable support but, of course, the availability of phthalic anhydride from this source is limited by the availability of naphthalene.

In recent developments in the petroleum industry leading toward the goal of producing the maximum quality in the matter of octane rating of aviation gasoline, one of the important developments has been in an operation in which naphthene-containing hydrocarbons are treated at high temperatures and pressures with added hydrogen in the presence of a suitable catalyst which is usually an oxide of the VI group metal supported on a suitable base. This process results in the production of a product containing appreciable quantities of aromatics, such as benzene, toluene and the various xylene isomers. It so happens that ortho-xylene is not a particularly good additive to aviation gasoline, or at least it is not as valuable as the meta- and para-isomers. Therefore there have been developed processes for separating this material from admixture with the meta- and para-isomers and including only the latter in aviation gasoline. The result of that is that there are available quantities of ortho-xylene.

It is possible to oxidize with air or any oxygen-containing gas under carefully controlled conditions, ortho-xylene to phthalic acid, but this process has several disadvantages including the following: In the first place, the operation involves a life hazard since to mix oxygen or air with a hydrocarbon at high temperatures always presents the possibility of inducing or causing explosions. Second, large quantities of gases must be handled. Third, the reaction is of course highly exothermic and hence large quantities of heat must be removed from the catalyst bed.

I have discovered a method for oxidizing ortho-xylene in an endothermic reaction (not employing oxygen) under conditions which will give good yields and a high selectivity at moderate operating conditions.

The main object of my invention therefore is to produce from ortho-xylene, phthalic acid and/or anhydride in a safe, expeditious and economical manner.

Other and further objects of my invention will appear from the more detailed description and claims, which follow.

In the accompanying drawing I have shown diagrammatically, a flow plan in which a preferred embodiment of my invention may be carried into effect. 1 represents a reactor containing a body of catalyst C supported on a grid 3. The catalyst which I prefer to use is Raney nickel, although any nickel catalyst which promotes the so-called steam-water gas reaction may be used. In carrying out the operation ortho-xylene is withdrawn from storage 10 through line 12 and passed through a fired coil 14 where it is heated to a temperature of, say, 600° F. and then withdrawn through line 16 and passed into a manifold 20 disposed within reactor 1 and above the bed of catalyst. I next pass steam from some source through line 22 into a super heater 24 where I heat it to a temperature of around 1000° F. and thereafter pass it via line 26 into steam manifold 28 disposed in the reactor. I next pass the steam into a plurality of run-down pipes 30 terminating in Venturi tubes 32 where it mixes with ortho-xylene also fed to the Venturi tubes through lines 34, the Venturi tubes serving to cause intimate mixture of the steam and ortho-xylene and the latter is heated to a temperature of about 800–950° F. Thereafter I discharge the steam-orthoxylene mixture through pipes 40 into the bed of catalyst, where it is forced through by the vapor pressure into contact with the catalyst. In the bed of catalyst the following reaction takes place:

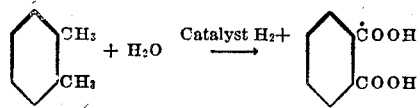

Reaction products are withdrawn through line 42, passed through a waste heat boiler 45 where the temperature is reduced to just above the condensation temperature of phthalic acid and then the material is charged to a quenching zone 50 where it is quenched with water injected through line 52. The unconverted ortho-xylene, phthalic acid and water form a slurry which collects in the bottom of the quenching tower. Hydrogen and fixed gas are vented through line 53. This slurry may be withdrawn through line 60 and subjected to distillation or other purification means to yield commercially pure phthalic acid and unconverted xylene recovered from the purification system 62 (diagrammatically shown) may be recycled to storage 10 via line 65 for further treatment. Water is separated via line 66.

Referring again to operating conditions, as stated the catalyst is preferably a nickel base catalyst of which Raney nickel is an example.

The temperature maintained in the reaction zone should be between 650 and 1300° F., preferably about 800° F.

The steam to hydrocarbon mol ratio should be between 1/1 and 100/1, preferably about 10 mols of steam per mol of ortho-xylene.

The pressure should be about atmospheric in the reaction zone although pressures up to 50 pounds per square inch gauge are not objectionable, and the flow rate should be such that the ortho-xylene is in contact with the catalyst in the reaction zone for a time of about 2 seconds, although contact times between 0.1 second and 2 minutes give good results depending on conditions.

A modification of my invention which gives good results is to bleed into the reactor a small quantity of air or other oxygen-containing gas through line 21.

The process I have described above results in the production of phthalic acid because of the large quantities of steam present. It is a simple matter to convert the phthalic acid to phthalic anhydride by simply heating in known manner.

To recapitulate briefly, my invention is based on the observation that a methyl group attached to an aromatic ring may be oxidized without causing the ring itself to be attacked. This led to the discovery that I could oxidize ortho-xylene by the water-gas reaction to give good yields of phthalic acid which could thereafter be converted to phthalic anhydride, according to known procedure.

While I prefer to use nickel, I may use a copper chromite catalyst containing a small quantity of nickel, say 1%, or I may use any of a number of nickel base catalysts which are known to promote the reaction between a paraffin hydrocarbon and steam to yield hydrogen and an oxidation product of the hydrocarbon.

Numerous modifications of my invention will be apparent to those who are familiar with this art and it is my intention to claim as my invention all of the material disclosed herein and all of that included by necessary implication, except that subject matter excluded by the terms of the appended claims.

What I claim is:

1. The method of converting ortho-xylene to phthalic acid which consisting essentially in contacting a mixture of steam and ortho-xylene with a nickel catalyst at temperatures in the range of from 800–1000° F. while under a pressure of the order of atmospheric pressure with a nickel containing catalyst for a relatively short period not exceeding about 2 seconds in a reaction zone and recovering a product containing phthalic acid.

2. The method of claim 1 in which the ratio of steam to ortho-xylene in the reaction zone is from about 1 to 100 mols of steam per mol of ortho-xylene.

3. The method of claim 1 in which the ratio of steam to ortho-xylene is about 10 mols of steam per mol of ortho-xylene.

4. The method of converting ortho-xylene to phthalic acid which comprises contacting a nickel-containing catalyst with a gas mixture consisting of steam and ortho-xylene in the ratio of 10 mols of steam to 1 mol of ortho-xylene at temperatures in the range of from 800 to 1000° F. and about atmospheric pressure for a period not exceeding about 2 seconds in a reaction zone and recovering a product containing phthalic acid.

WALTER F. ROLLMAN.

REFERENCES CITED

The following references are of record in the file of this patent:

UNITED STATES PATENTS

| Number | Name | Date |
|---|---|---|
| 2,020,671 | Dreyfus | Nov. 12, 1935 |
| 698,355 | Bazlen | Apr. 22, 1902 |
| 2,128,908 | Bludworth | Sept. 6, 1938 |

OTHER REFERENCES

Buylla et al., British Chem. Abst., A, 1933, p. 943.

Ellis, "Chem. of Petroleum Deriv.", vol. II, (1937), pp. 272–3.